(12) United States Patent
Angelillo

(10) Patent No.: US 11,247,637 B1
(45) Date of Patent: Feb. 15, 2022

(54) AUTOMOBILE WHEEL LUG NUT ALARM DEVICE AND SYSTEM

(71) Applicant: Michael Angelillo, Parkland, FL (US)

(72) Inventor: Michael Angelillo, Parkland, FL (US)

( * ) Notice: Subject to any disclaimer, the term of this patent is extended or adjusted under 35 U.S.C. 154(b) by 0 days.

(21) Appl. No.: 17/308,947

(22) Filed: May 5, 2021

Related U.S. Application Data

(60) Provisional application No. 63/020,597, filed on May 6, 2020.

(51) Int. Cl.
*B60R 25/40* (2013.01)

(52) U.S. Cl.
CPC .................................. *B60R 25/40* (2013.01)

(58) Field of Classification Search
CPC ...................................................... B60R 25/40
USPC ...................................................... 340/426.33
See application file for complete search history.

(56) References Cited

U.S. PATENT DOCUMENTS

| | | | | |
|---|---|---|---|---|
| 4,709,654 A * | 12/1987 | Smith | ....................... | B60B 3/16 116/281 |
| 5,552,759 A * | 9/1996 | Stoyka | ................ | B60R 25/1001 116/28 R |
| 7,994,901 B2 * | 8/2011 | Malis | ....................... | B60B 3/16 340/426.33 |
| 8,156,820 B2 * | 4/2012 | Dral | ....................... | B23P 19/067 73/761 |
| 8,525,653 B1 * | 9/2013 | Bing | ....................... | F16B 41/005 340/426.1 |
| 8,976,029 B1 * | 3/2015 | McTigue | ............. | G06Q 10/087 340/572.1 |
| 10,099,655 B2 * | 10/2018 | Davis | ....................... | B60R 25/24 |
| 10,794,783 B2 * | 10/2020 | Pagani | .................. | F16B 31/028 |
| 10,938,447 B1 * | 3/2021 | Sorensen | ............ | H04B 5/0043 |
| 10,941,802 B2 * | 3/2021 | Zhu | .................. | G06K 19/07758 |
| 2010/0054891 A1 * | 3/2010 | Nishida | ................... | F16B 31/02 411/9 |
| 2012/0198941 A1 * | 8/2012 | Smith | ................... | F16B 31/028 73/761 |
| 2019/0249706 A1 * | 8/2019 | Hess | ....................... | B60B 27/00 |
| 2021/0370868 A1 * | 12/2021 | Sakurada | ................ | B60R 25/40 |

\* cited by examiner

*Primary Examiner* — Nay Tun
(74) *Attorney, Agent, or Firm* — David P. Lhota, Esq.; Lhota & Associates, P.A.

(57) ABSTRACT

A motor vehicle wheel lug nut device and system for automobiles, trucks, motorcycles, trailers and the like that is equipped with an alarm device and system for alarming owners when a lug nut is being removed in a potential theft situation wherein the alarm device and system includes a lug nut with a cavity housing a circuit board, blue tooth transmitter on one side of the circuit board, circuit board mounting screws, battery connect, retention spring, activation button and mounting screws, and wireless transceiver having a wireless receiver and Wi-Fi or Bluetooth® transmitter, reset button, activation or arming button and back-up power supply.

19 Claims, 12 Drawing Sheets

AUTOMOBILE WHEEL LUG NUT ALARM DEVICE AND SYSTEM

CROSS-REFERENCE TO RELATED APPLICATION

This application claims the benefit of U.S. provisional patent application Ser. No. 63/020,597 filed May 6, 2020.

STATEMENT REGARDING FEDERALLY SPONSORED RESEARCH OR DEVELOPMENT

N/A

FIELD OF THE INVENTION

The present invention relates generally to an alarm lug nut device and system, and more generally, to an alarm lug nut for vehicle wheels, such as wheels on automobiles, trucks, motorcycles, trailers and the like, that is equipped with an alarm circuit, wireless signal receiver or transmitter (such as Bluetooth) and battery that makes wireless communication with a control module that is activated to inform a vehicle owner or authorities when tires and rims are removed without authorization or stolen.

BACKGROUND OF THE INVENTION

The theft of automobile rims and tires is commonplace and, in fact, is more prevalent with the recent development and popularity of expensive, stylistic rims. Tire rims and the tires can cost thousands of dollars and am hot items on the black market. Stolen rims normally are never recovered, leaving the vehicle owner stranded and having to replace the rims and tires. Therefore, there exists a need for an alarm lug nut and device for automobiles that warms the owner when someone is trying to remove a rim and tire without authorization. It is, therefore, to the effective resolution of the aforementioned problems and shortcomings of the prior art that the present invention is directed. The instant invention addresses this unfulfilled need in the prior art by providing an alarm lug nut and control module for automobiles as contemplated by the instant invention disclosed herein.

SUMMARY OF THE INVENTION

In the present invention, these purposes, as well as others which will be apparent, are achieved generally by providing a motor vehicle wheel lug nut device and system.

It is also an object of the instant invention to provide a motor vehicle wheel lug nut device and system for automobiles, trucks, motorcycles, trailers and the like that is equipped with an alarm circuit for alarming owners when a lug nut is being removed in a potential theft situation.

It is another object of the instant invention to provide a motor vehicle wheel lug nut device and system for automobiles, trucks, motorcycles, trailers and the like that is equipped with an alarm circuit with a wireless signal receiver or transmitter.

It is an additional object of the instant invention to a motor vehicle wheel lug nut device and system for automobiles, trucks, motorcycles, trailers and the like that is equipped with an alarm circuit that is self-powered.

In accordance with one aspect, the present invention provides a motor vehicle wheel lug nut device for automobiles, trucks, motorcycles, trailers and the like that is equipped with an alarm device and system for alarming owners when a lug nut is being removed in a potential theft situation wherein the alarm device and system includes a lug nut with a circuit board, blue tooth transmitter on one side of the circuit board, battery, circuit board mounting screws and lug nut cap.

In another aspect, the present invention provides a motor vehicle wheel lug nut device and system for automobiles, trucks, motorcycles, trailers and the like that is equipped with an alarm device and system for alarming owners when a lug nut is being removed in a potential theft situation wherein the alarm device and system includes a lug nut with a circuit board, blue tooth transmitter on one side of the circuit board, battery, circuit board mounting screws, lug nut cap and wireless transceiver having a wireless receiver and Wi-Fi or Bluetooth® transmitter.

In an additional aspect, the present invention provides a motor vehicle wheel lug nut device and system for automobiles, trucks, motorcycles, trailers and the like that is equipped with an alarm device and system for alarming owners when a lug nut is being removed in a potential theft situation wherein the alarm device and system includes a lug nut with a cavity housing a circuit board, blue tooth transmitter on one side of the circuit board, circuit board mounting screws, battery connect, retention spring, activation button and mounting screws, and wireless transceiver having a wireless receiver and Wi-Fi or Bluetooth® transmitter, reset button, activation or arming button and back-up power supply.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
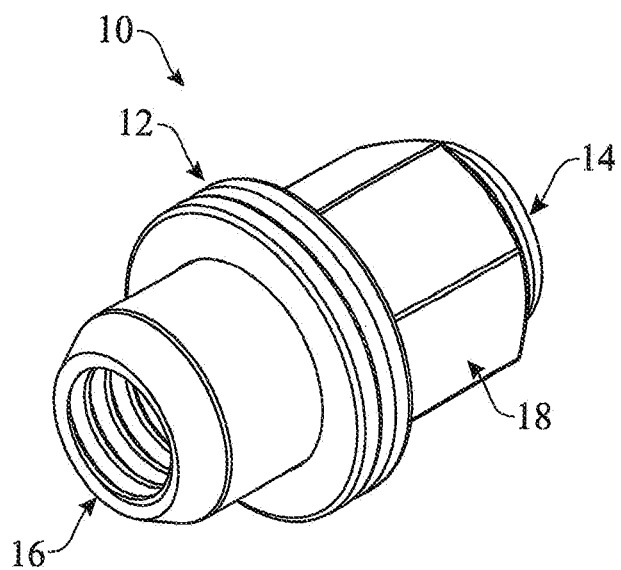
FIG. 1 is a bottom perspective view of the alarm lug nut device from the threaded end in accordance with the preferred embodiment of the instant invention.

With reference to the drawings, FIGS. 1 to 14 depict the preferred embodiment of the alarm lug nut device and system of the instant invention which is generally referenced as an alarm lug nut device, alarm system, control system and, or by numeric character 10. Referring to drawings, the instant invention 10 provides an alarm lug nut 10 with a wireless communication circuit board 20 and control module 30 for determining when an active alarm lug nut 10 is being removed from a corresponding disc threaded rod without authorization or disabling the control module. When the control module 30 is activated, it can detect when a circuit in the alarm nut is closed causing it to send a signal to the control module 30 indicating that the lug nut 10 is being removed. The control module 30 then sends a warning signal to a wireless communication device 8, such as a cell phone, and, or to the car alarm 7 or authorities. When the circuit in the alarm lug nut 10 is open, the lug nut 10 is properly secured and no signal is sent.

Figure 2:
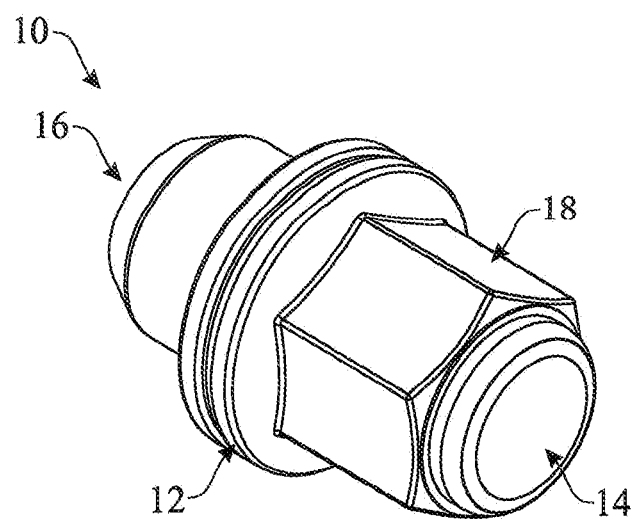
FIG. 2 is a top perspective view of the alarm lug nut device from the lug nut cap end in accordance with the preferred embodiment of the instant invention.

With reference to FIGS. 1 and 2, the alarm lug nut 10 of the instant invention has a lug nut body 12, lug nut cap 14, hex nut end 18 and a female threaded end. The threaded end 16 is mounted to a disc threaded rod 4 in a conventional manner. The lug nut cap 14 is the part of the alarm lug nut 10 that secures all the components inside the lug nut cavity 15.

Figure 3:
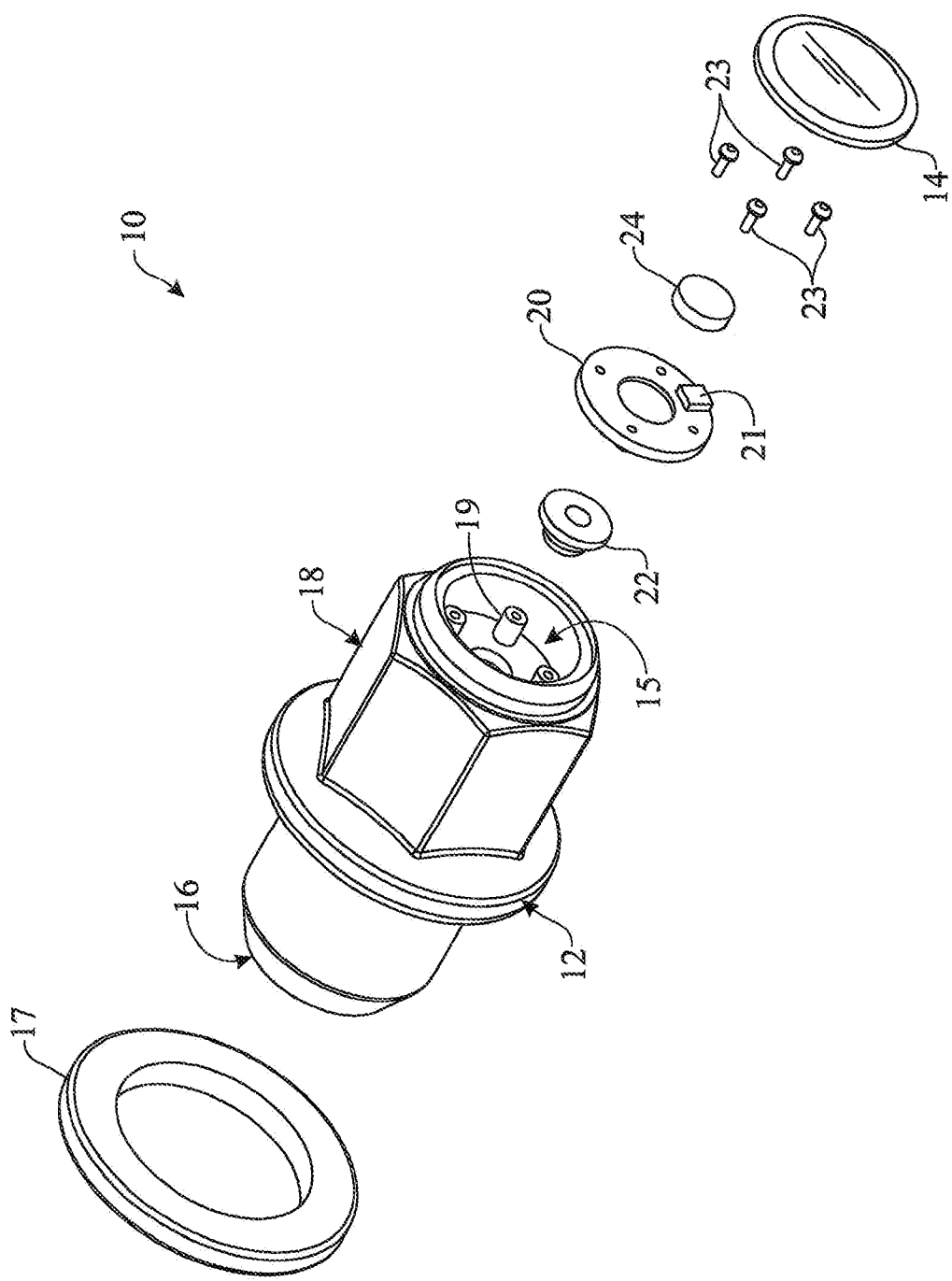
FIG. 3 is an exploded view of the alarm lug nut device from the lug nut cap end in accordance with the preferred embodiment of the instant invention.
Figure 4:
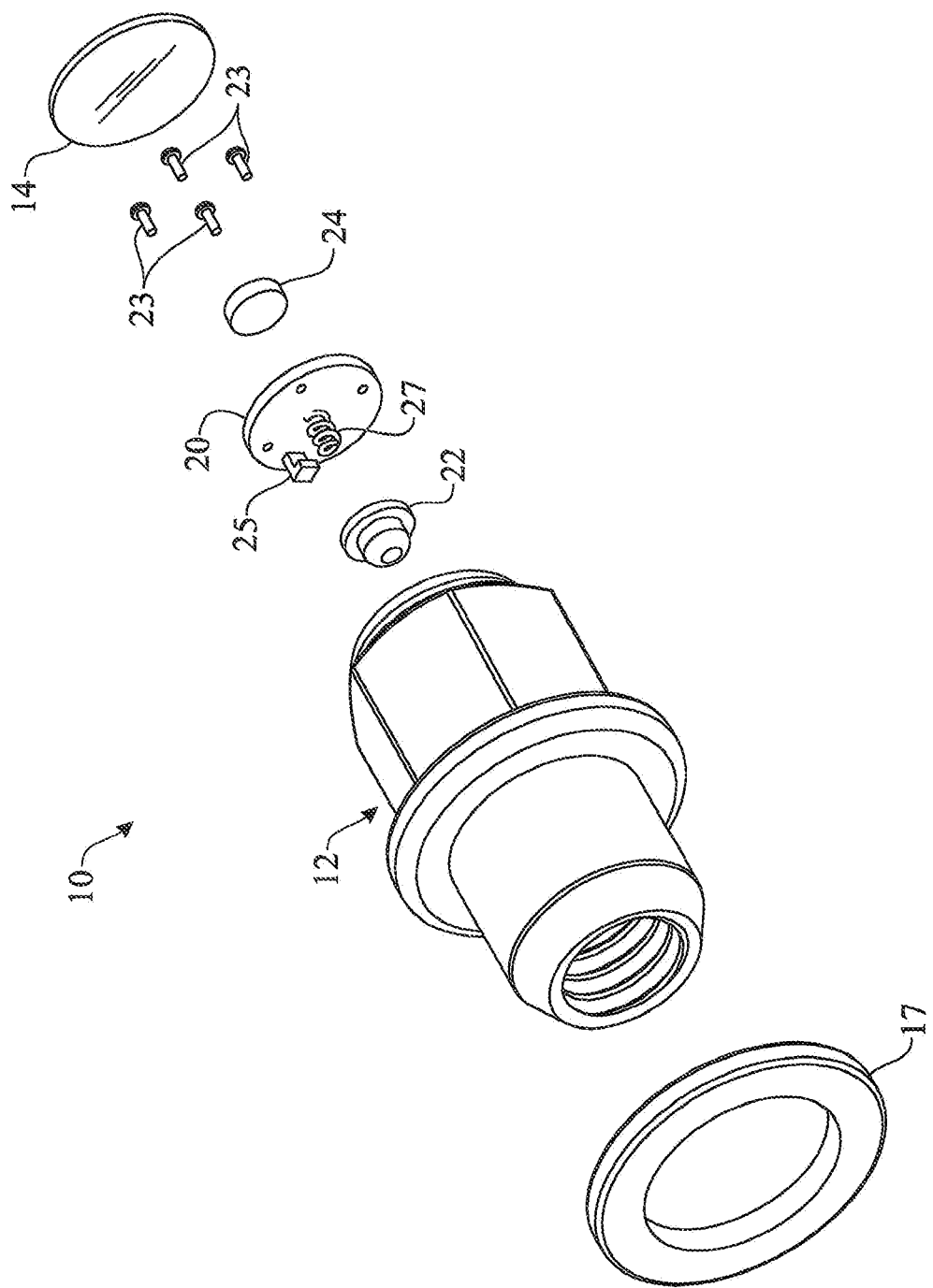
FIG. 4 is an exploded view of the alarm lug nut device from the threaded end in accordance with the preferred embodiment of the instant invention.

Referring to FIGS. 3 and 4, the alarm lug nut 10 has a lug spacer 17, lug nut body 12, circuit board 20, Bluetooth®, Wi-Fi, radio frequency (RF) or comparable transmitter 21 on one side of the circuit board 20, battery 22, circuit board mounting screws 23 and lug nut cap 14. On the opposite side of the circuit board 20 there is a battery connect 25 and retention spring 27. A cavity 15 is defined in the hex nut end 18 wherein there are a plurality of threaded mounting screw ports 19 for receiving the circuit board mounting screws 23.

The activation button 22, circuit board 20, and battery 24 are inserted inside the lug nut cavity 15. The lug nut cap 14 is mounted to the cavity 15 to secure the contents in the cavity 15. The battery 24 fits inside an opening in the circuit board 20, as shown in FIG. 3. With reference to FIG. 4, the retention spring 17 projecting from the circuit board 20 engages the activation button 22 and the battery connect 25 fits around a portion of the button 22.

Figure 5:
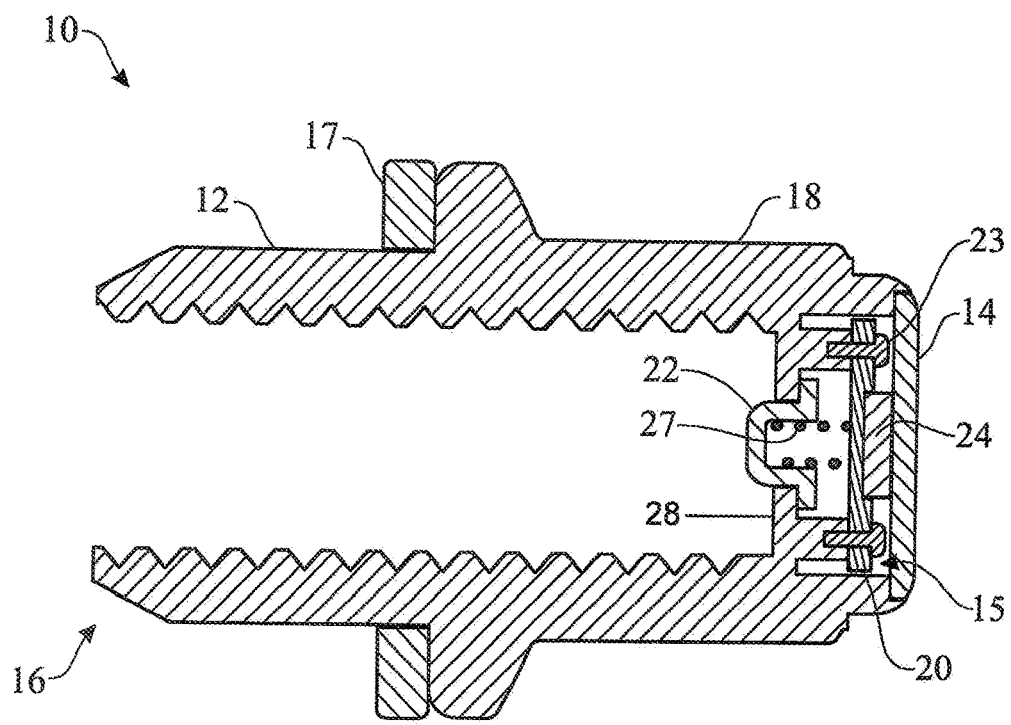
FIG. 5 is a first cross-sectional view of the alarm lug nut device from an angle showing the circuit board mounting screws in accordance with the preferred embodiment of the instant invention.
Figure 6:
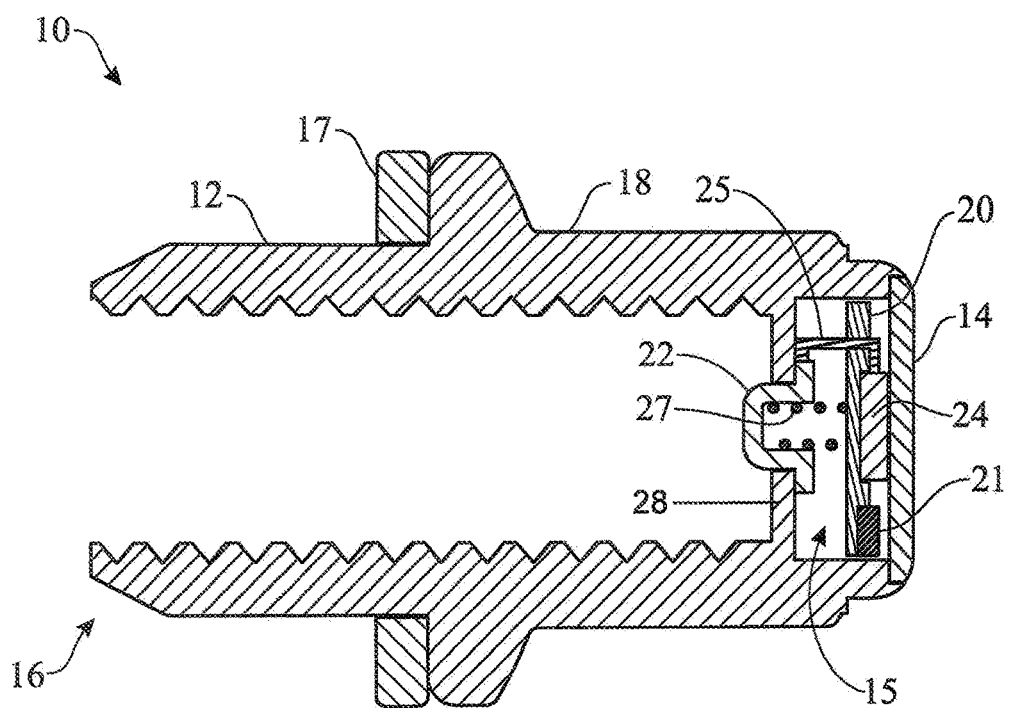
FIG. 6 is a second cross sectional view of the alarm lug nut device from an angle showing the battery connect in accordance with the preferred embodiment of the instant invention.

Referring to FIGS. 5 and 6, the activation button 22 is shown installed in the lug nut cavity 15 of the lug nut body 12 along with the circuit board 20, circuit board mounting screws 23 and battery 24, while the lug nut cap 14 is mounted to the lug nut end 18 over the cavity 15. The circuit board mounting screws 23 secure the circuit board 20 in the cavity 15. The retention spring 27 fits inside a cavity defined by the activation button 22 and is compressed when the alarm lug nut 10 is installed to open the circuit so no current from the battery 24 flows to the circuit 20 and extends as it is unscrewed causing the activation button 22 to come into contact with a lug nut grounding lip 28 and battery connect 25 thus connecting the circuit 20 to ground and the battery 24 to close the circuit 20. The battery connect 25 engages the top of the activation button 22 when the alarm lug nut 10 is screwed and releases from the activation button 22 as the alarm lug nut 10 is unscrewed. The lug nut spacer 17 mounts over the threaded end 16 of the alarm lug nut 10. The lug nut body 12 may be made of a metal or other electrical grounding material so as to act as an electrical ground for the circuit board 20 when the activation button 22 is pressed into contact with the lug nut grounding lip 28 and, or battery connect 25 so as to complete the circuit with the battery 24.

Figure 7:
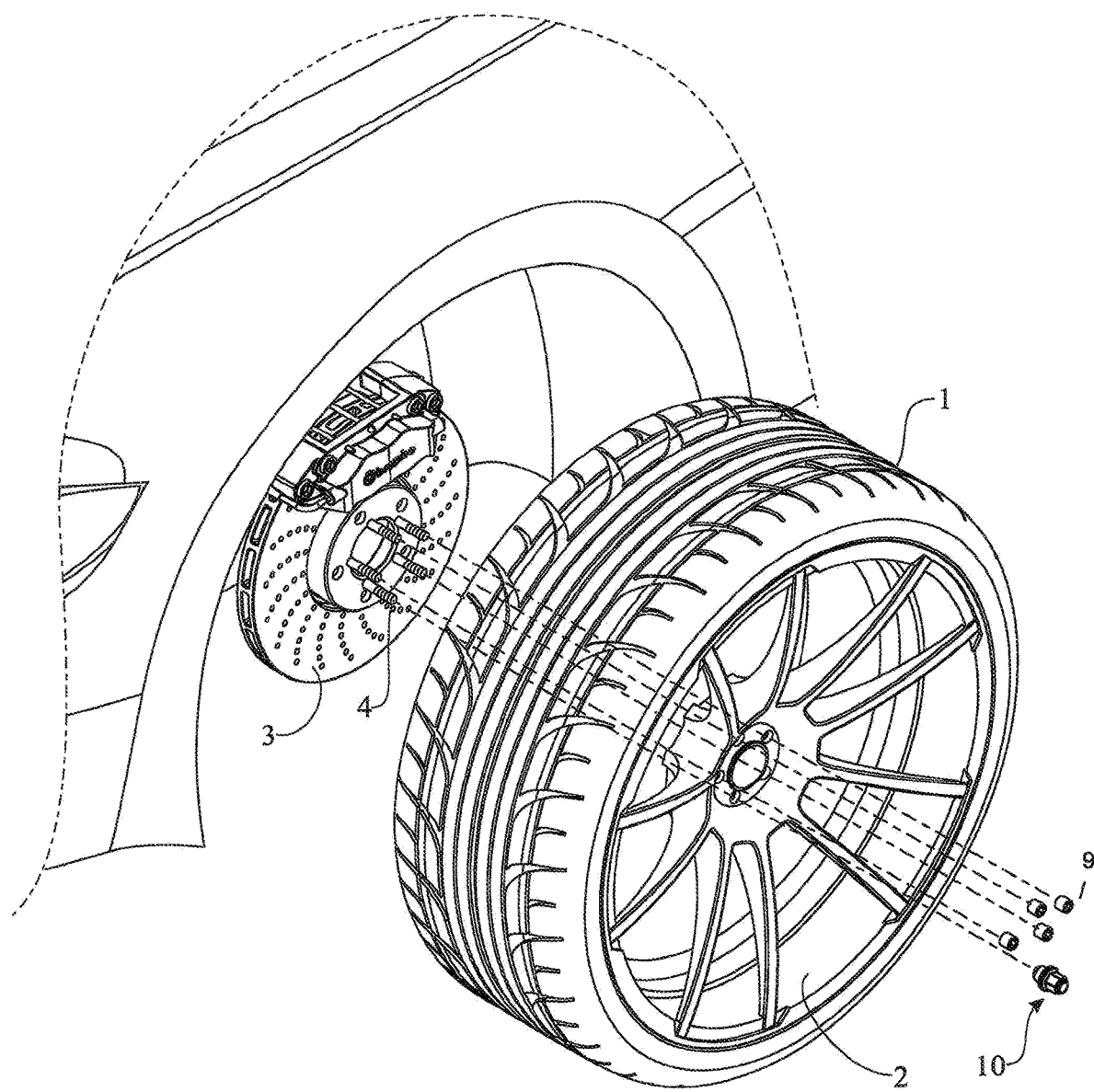
FIG. 7 is an exploded perspective view of the alarm lug nut device being installed on a rim and wheel disc with normal lug in accordance with the preferred embodiment of the instant invention.
Figure 8:
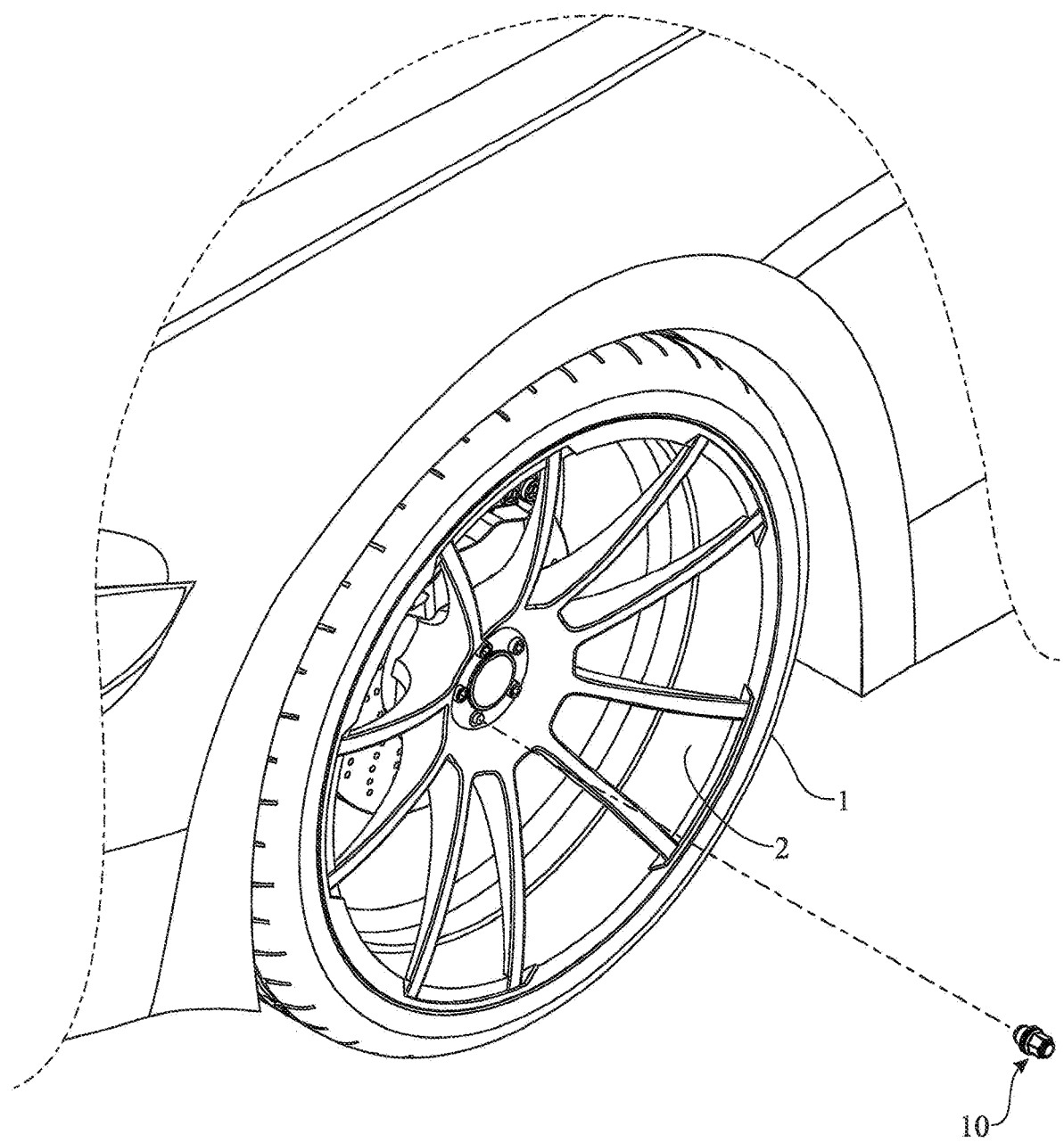
FIG. 8 is a perspective view of the alarm lug nut device being installed on a rim and rim disc threaded rod in accordance with the preferred embodiment of the instant invention.
Figure 9:
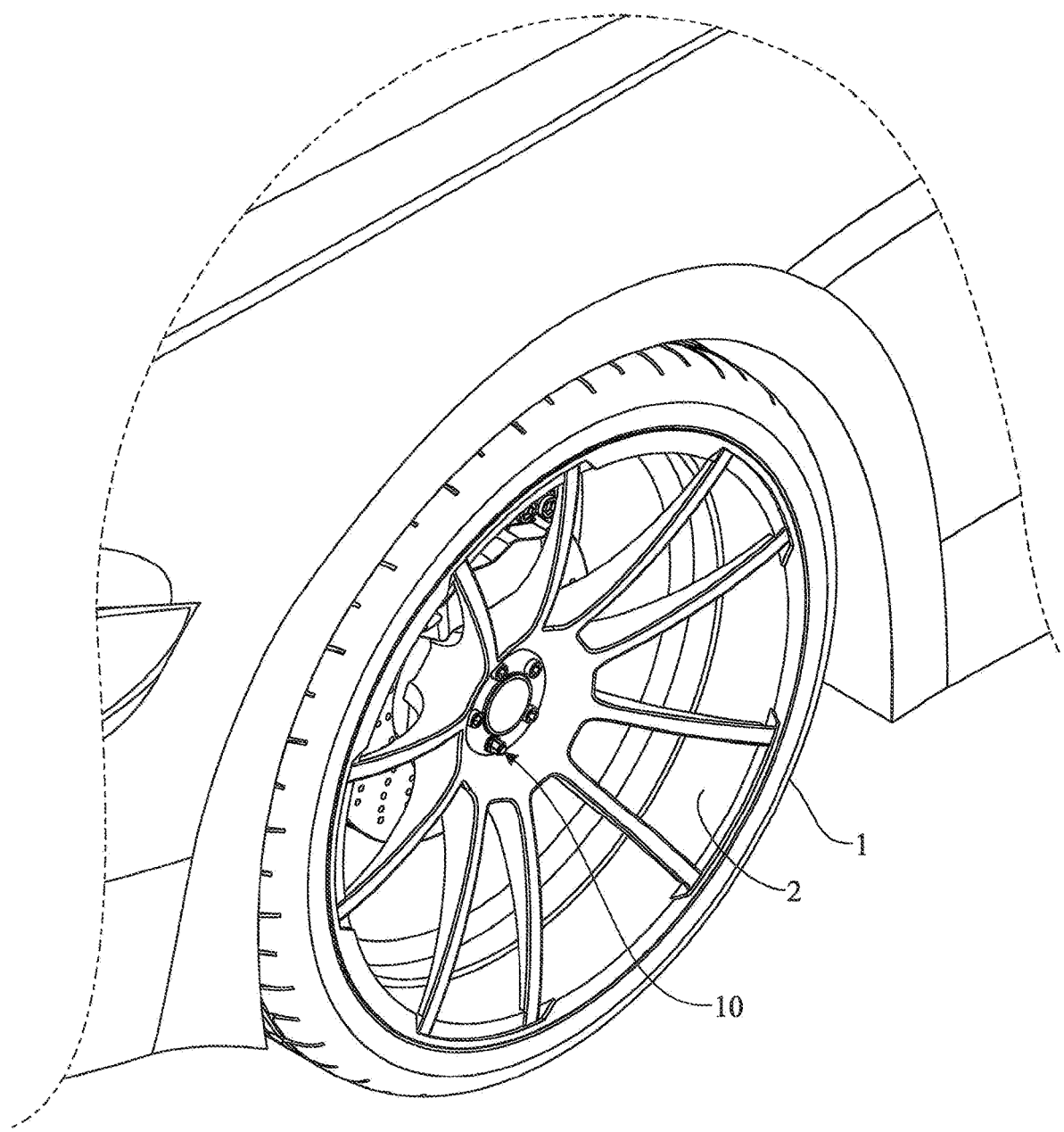
FIG. 9 is a perspective view of the alarm lug nut device installed on a rim and rim disc threaded rod in accordance with the preferred embodiment of the instant invention.

Referring to FIGS. 7-9, a tire 1 and rim 2 is installed as is known except that at least one alarm lug nut 10 replaces a conventional lug nut 9. The rim 2 is mounted to the tire or rim disc by passing the threaded rim disc rods 4 through tire rim 2. Then at least one alarm lug nut 10 is screwed over a threaded rim disc rod 3. More than one alarm lug nut 10 may be used for additional security in the event one malfunctions and to improve the chance for a quicker alarm signal being sent. Multiple alarm lug nuts 4 can also be able to communicate with each other with a wireless signal.

Figure 10:
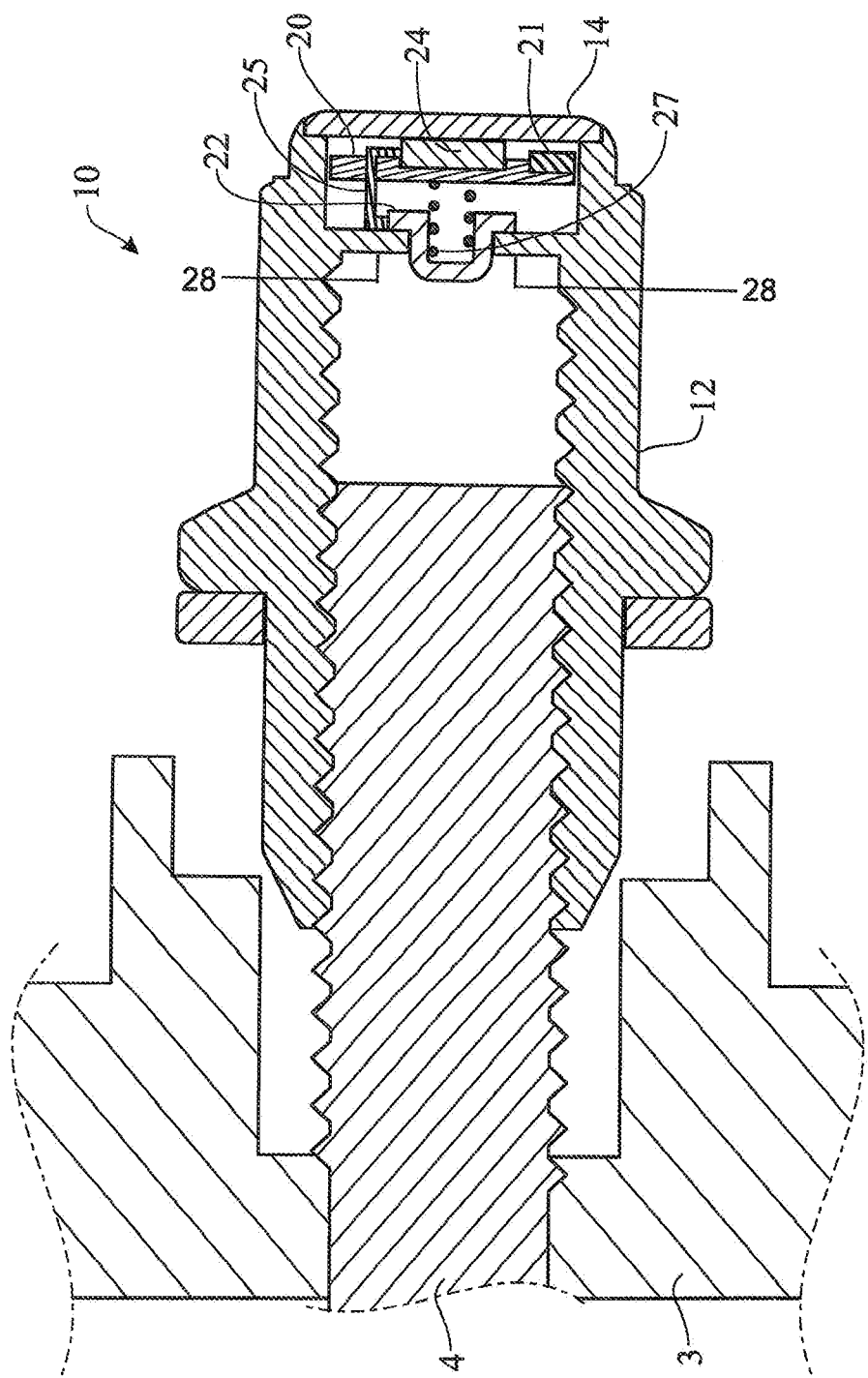
FIG. 10 is a cross-sectional view of the alarm lug nut device being installed on a rim disc threaded rod in accordance with the preferred embodiment of the instant invention.
Figure 11:
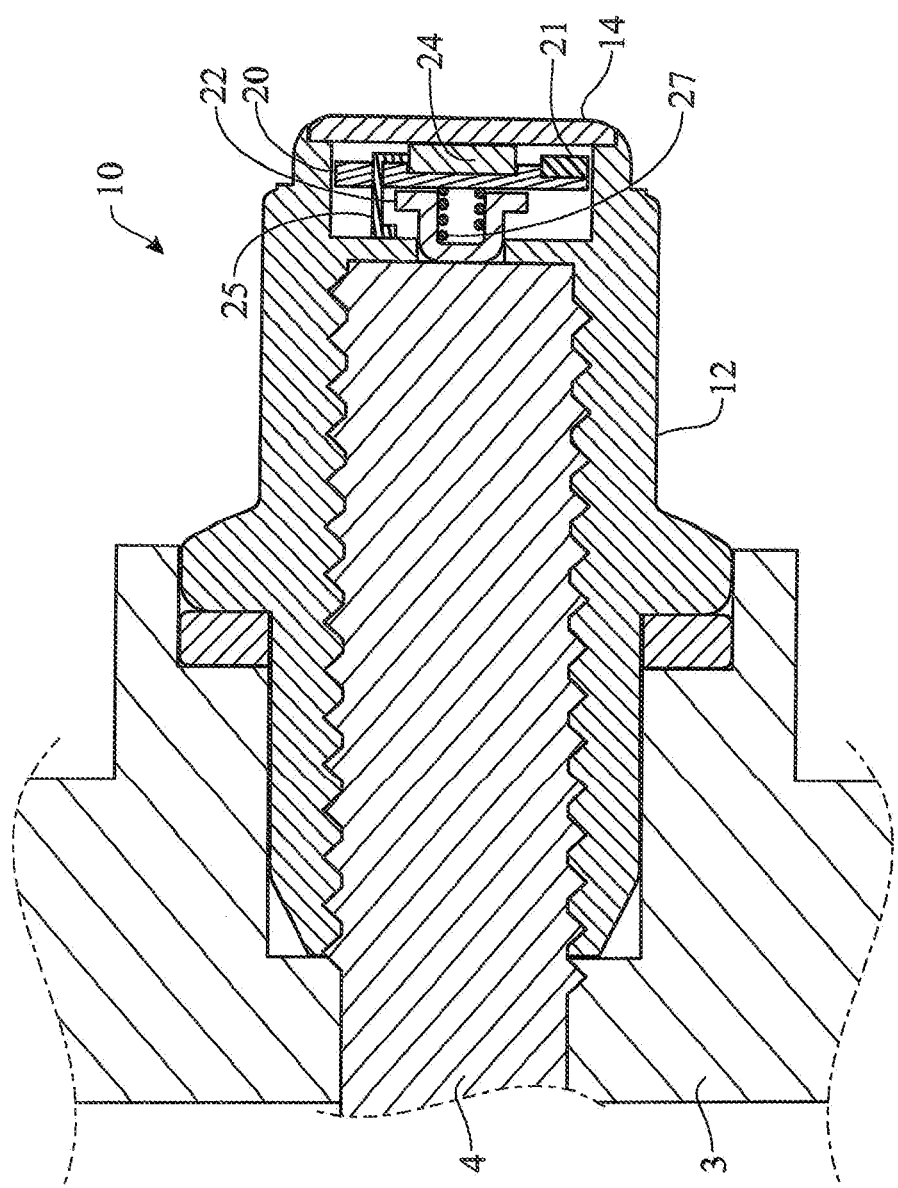
FIG. 11 is a cross-sectional view of the alarm lug nut device fully installed on a rim disc threaded rod and the activation button in contact with the circuit board to signal an alarm in accordance with the preferred embodiment of the instant invention.

Referring to FIGS. 10 and 11, the retention spring 17 extends when the alarm lug nut 10 is unscrewed from a threaded rim disc rod 4 and compressed when the alarm lug nut 10 is screwed downward onto the threaded disc rod 4. When the alarm lug nut 10 is fully installed on the disc rod 4, the spring 17 is compressed and the battery connect 25 released from the activation button 22 such that it is not touching or making any contact with the activation button 22 and hence the battery 24. When the alarm lug nut 10 is being unscrewed the battery connect 25 comes in contact with the activation button 27, contacting and grounding the circuit board 20 through the activation button 22 to the battery 24 and ground or grounding lip 28. The circuit between the battery 24, circuit board and the grounded activation button 22 is then closed causing a wireless signal to be sent to the control module 30 and the alarm to sound.

Figure 12:
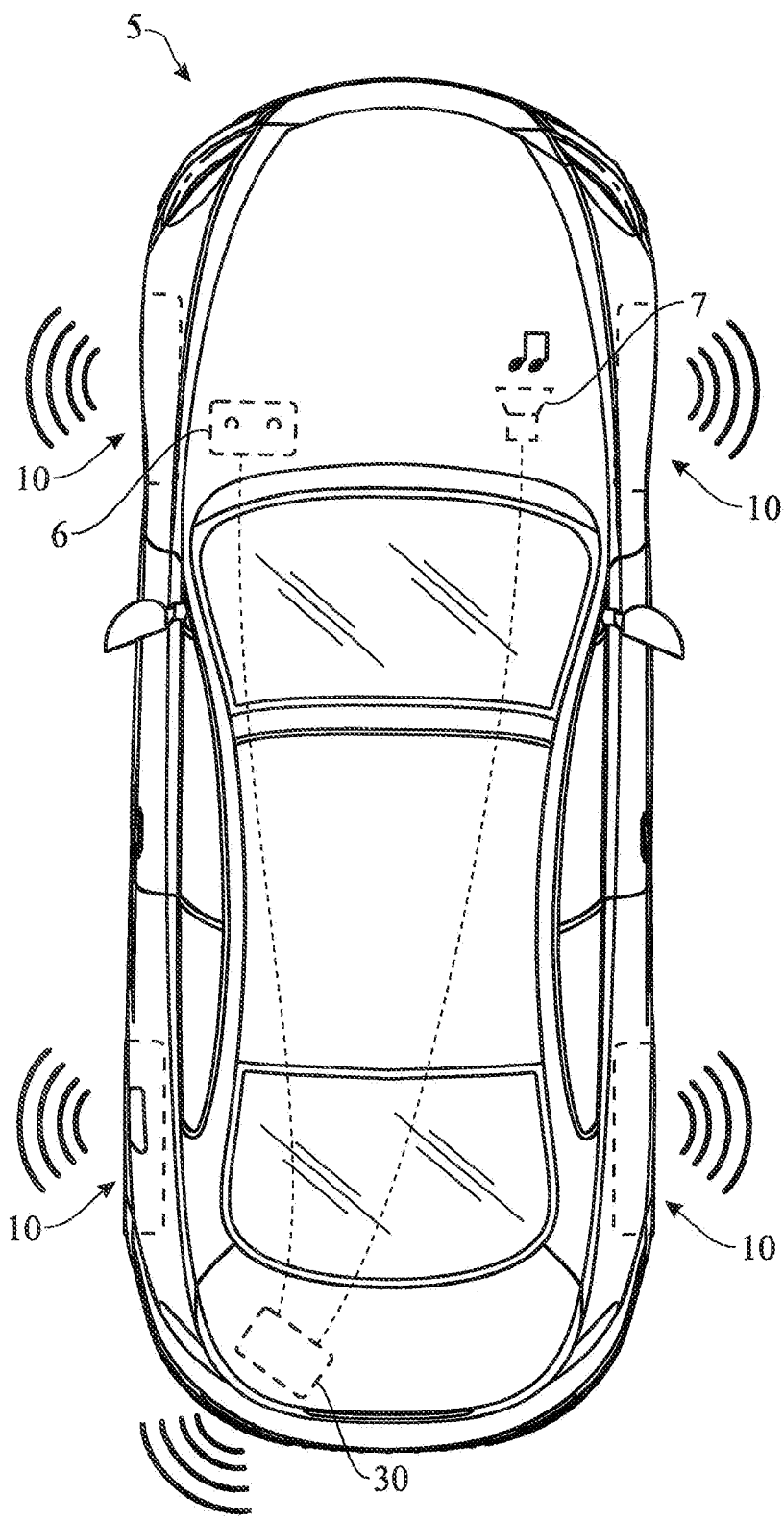
FIG. 12 is an illustrative view of a vehicle having an alarm lug nut device and system having a control module that communicates with the vehicle battery and vehicle alarm in accordance with the preferred embodiment of the instant invention.
Figure 13:
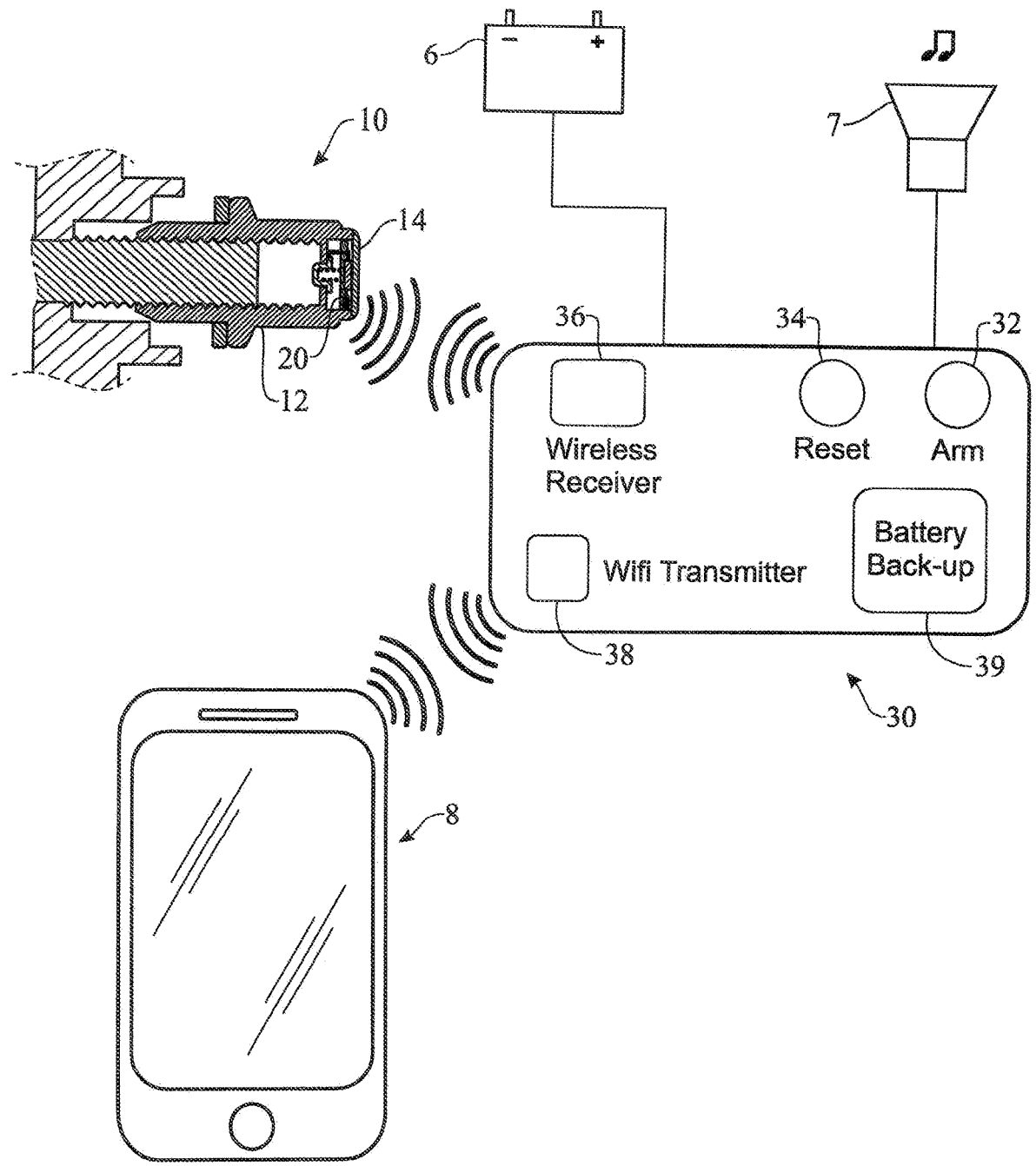
FIG. 13 is a block diagram of the alarm lug nut device and system illustrating communication between the alarm lug nut device and control module and with a wireless communication device in accordance with the preferred embodiment of the instant invention.

Referring to FIGS. 12 and 13, the control module 30 is placed in a vehicle 5, preferably the trunk, and communicates with the alarm lug nut 10. The control module 30 is preferably powered by the car battery 6 but may also receive power from a back-up battery 39. The control module 30 has an arming button or switch 32, reset switch 34, wireless receiver 36, WIFI transmitter 38 and back-up battery 39. The arming button 32 enables the control module 30 while the reset button 34 resets the control module 30. When alarm lug nut 10 is being removed, the circuit is closed powering the circuit board 20, which energizes the transmitter 21 causing it to transmit a wireless signal to the wireless receiver 36. The control module 30 then activates the transmitter 38 causing it to transmit a warning signal to a car owner's or other person's communication device 8. This may cause the car alarm 7 to be sounded and, or as the WIFI transmitter 38 is energized and activated to send the warning signal. It may also activate the WIFI transmitter 38, which transmits a signal to a wireless or mobile communication device 8. The communication device could be the car owners cell phone and, or the police. If within range, the alarm system of the instant invention 10 can sync with a phone app to alert the owner that the alarm is trigged. To disable the control module 30, such as when replacing a tire, the reset button 34 or power switch may be actuated.

Figure 14:
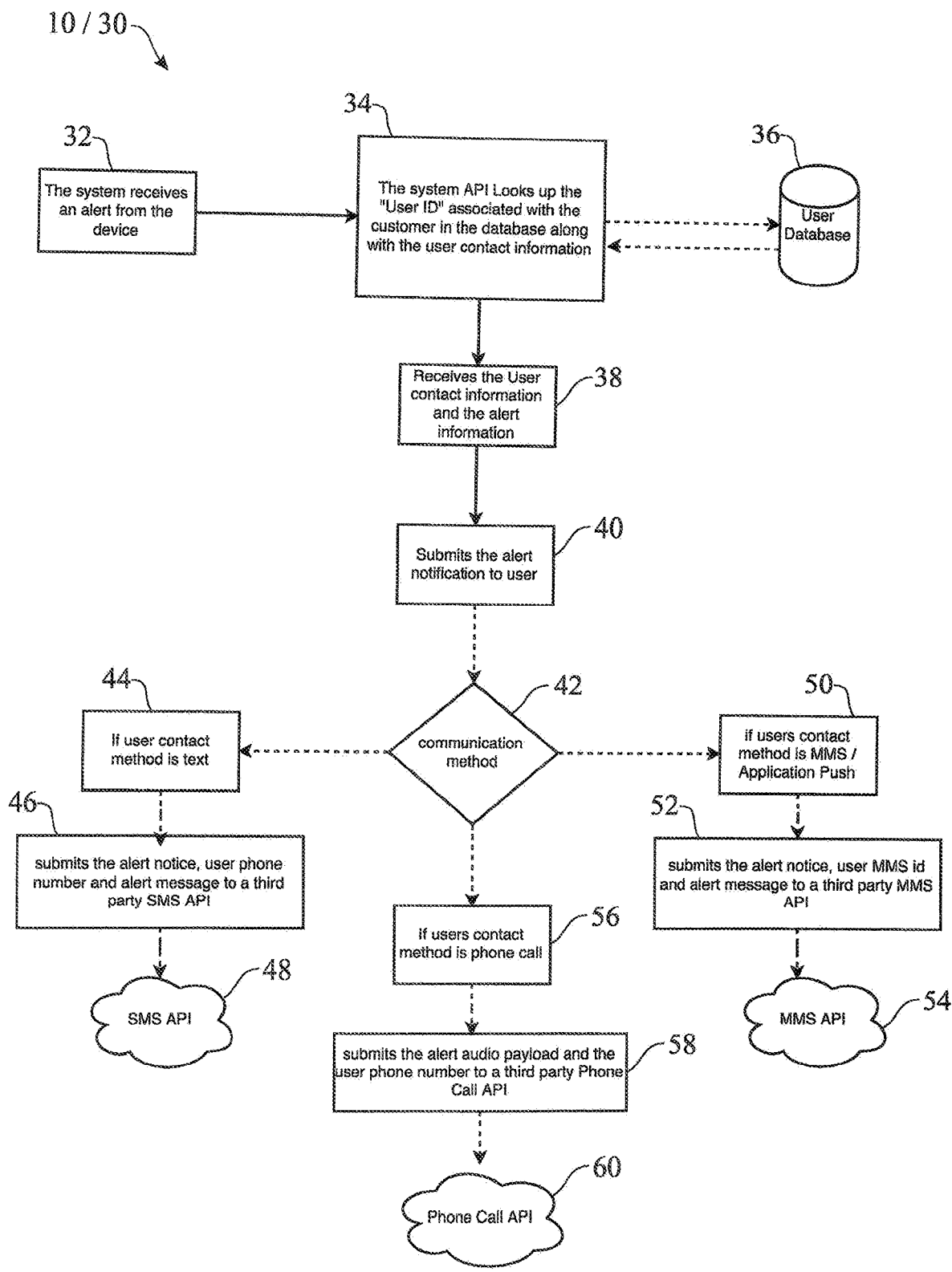
FIG. 14 is a flow diagram of the steps and operation of the alarm lug nut device and system in accordance with the preferred embodiment of the instant invention.

With reference to FIG. 14, in operation the alarm system 30 of the alarm lug nut invention 10 receives an alert from the alarm lug nut device 10 (32). The system application programming interface (API) identifies the "User ID" associated with the vehicle owner/customer in the user database along with the user contact information (34, 36). The system receives the user contact information and the alert information (38) and submits an alert notification to the user (40). The system then determines the preferred customer communication method (42), which may be via text (44), phone call (56) or multimedia messaging service (MMS)(50). If the user contact method is text, the alert notice, user phone number and alert message are submitted to a third part short message service (SMS) API, which then sends the message (44-48). If the user contact method is a phone call, the alert audio payload and the user phone number are submitted to a third party "Phone Call" API and the phone call to the customer is made (56-60). If the user contact method is MMS/Application-Push, the alert notice, user MMS ID and alert message are sent to a third-party MMS API which sends the message (50-54).

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A motor vehicle lug nut alarm system, comprising:
    a lug nut body having a threaded end for mounting to a tire mount bolt and a hex nut end;
    a cavity defined in said hex nut end;
    said cavity being adapted for receiving and storing:
        a circuit board;
        a first wireless transmitter in electrical communication with said circuit board for transmitting a warning signal as said lug nut body is being removed from the tire mount bolt; and
        a battery in communication with said circuit board;
    a control module in wireless communication with said first wireless transmitter, said control module having a wireless receiver for receiving said warning signal from said first wireless transmitter and a second wireless transmitter for transmitting a second warning signal to a communication device to warn when said lug nut is being removed; and
    an activation switch comprising a button and a spring mechanically communicating said button with said circuit board wherein said button is pressed inward as said lug nut body is being mounted on said tire mount bolt disconnecting said battery from said circuit board and extends outward as said lug nut body is being dismounted from the tire mount bolt electrically connecting said battery to said circuit board so as to trigger said first wireless transmitter.

2. The system of claim 1, wherein said activation switch is in communication with said circuit board for deactivating said circuit board when said lug nut body is mounted to a tire mount bolt and energizing said circuit board to trigger said first wireless transmitter to transmit said warning signal as said lug nut body is being removed from the tire mount bolt.

3. The system of claim 1, wherein said circuit board comprises:
    an aperture for receiving said battery and allowing said activation switch to enable said battery to provide power to said circuit board when said lug nut is being removed from the tire mount bolt to energize said first transmitter.

4. The system of claim 1, wherein said first wireless transmitter comprises:
    Bluetooth.

5. The system of claim 1, wherein said first wireless transmitter comprises:
    Wi-Fi.

6. The system of claim 1, wherein said first wireless transmitter comprises:
    a radio frequency transmitter.

7. The system of claim 1, further comprising:
    at least one mounting screw port defined in said cavity and said circuit board for receiving a mounting screw to secure said circuit board to said lug nut body in said cavity.

8. The system of claim 1, further comprising:
    a plurality of mounting screw ports defined in said cavity and said circuit board for receiving mounting screws to secure said circuit board to said lug nut body in said cavity.

9. The system of claim 1, wherein said control module comprises:
    a reset switch for resetting said control module.

10. The system of claim 9, wherein said control module comprises:
    an arming switch for energizing and arming said control module to be ready to receive a signal from said first transmitter.

11. The system of claim 1, wherein said control module comprises:
    an arming switch for energizing and arming said control module to be ready to receive a signal from said first transmitter; and
    a reset switch for resetting said control module.

12. A motor vehicle lug nut alarm system, comprising:
    a lug nut body having a threaded end for mounting to a tire mount bolt and a hex nut end;
    a cavity defined in said hex nut end;
    an inwardly projecting lip extending from the lug nut body into said cavity and defining a button receiving aperture;
    said cavity being adapted for receiving and storing:
        a circuit board;
        a first wireless transmitter in electrical communication with said circuit board for transmitting a warning signal as said lug nut body is being removed from the tire mount bolt; and
        a battery in communication with said circuit board;

a control module in wireless communication with said first wireless transmitter, said control module having a wireless receiver for receiving said warning signal from said first wireless transmitter and a second wireless transmitter for transmitting a second warning signal to a communication device to warn when said lug nut is being removed;

an activation switch having an activation button in alignment with said button receiving aperture and in communication with said circuit board for deactivating said circuit board when said lug nut body is mounted to a tire mount bolt and energizing said circuit board to trigger said first wireless transmitter to transmit said warning signal as said lug nut body is being removed from the tire mount bolt; and a battery connector connected at one end to said battery and selectively engageable at a free end with said activation button wherein said activation button comes in contact with said free end of said battery connector when said lug nut body as said lug nut body is being removed from the tire mount to electrically connect said battery to said circuit board.

13. The system of claim 12, wherein activation switch comprises:
    a spring mechanically communicating said activation button with said circuit board wherein said button is pressed inward as said lug nut body is being mounted on said tire mount bolt disconnecting said battery from said battery connector and circuit board and extends outward as said lug nut body is being dismounted from the tire mount bolt electrically connecting said battery to said circuit board through said battery connector so as to trigger said first wireless transmitter.

14. The system of claim 13, wherein said first wireless transmitter comprises:
    Bluetooth.

15. The system of claim 12, further comprising:
    at least one mounting screw port defined in said cavity and said circuit board for receiving a mounting screw to secure said circuit board to said lug nut body in said cavity.

16. The system of claim 12, further comprising:
    a plurality of mounting screw ports defined in said cavity and said circuit board for receiving mounting screws to secure said circuit board to said lug nut body in said cavity.

17. The system of claim 12, wherein said control module comprises:
    a back-up battery.

18. The system of claim 12, wherein said control module comprises:
    an arming switch for energizing and arming said control module to be ready to receive a signal from said first transmitter.

19. The system of claim 12, wherein said control module comprises:
    an arming switch for energizing and arming said control module to be ready to receive a signal from said first transmitter; and
    a reset switch for resetting said control module.

* * * * *